3,517,800
ROTARY CONVEYOR FOR ROLLED PRODUCTS
Otto Mödder, Dahlbruch, and Arno Schmidt, Kreuztal, Germany, assignors to Siegener Maschinenbau G.m.b.H., a corporation of Germany
Filed July 9, 1968, Ser. No. 743,407
Claims priority, application Germany, July 21, 1967, 1,602,149; Mar. 5, 1968, 1,652,558
Int. Cl. B65g 29/00
U.S. Cl. 198—210                                    10 Claims

ABSTRACT OF THE DISCLOSURE

Disclosed is an apparatus used to transversely convey through a coolant tank round or flat elongated workpieces delivered from a rolling mill. The apparatus comprises a plurality of wheels each having spokes. The wheels are carried in a spaced-apart relation on a horizontal drive shaft. The workpieces to be conveyed are positioned within the spaces between the spokes of the wheels in the lower peripheral half of the wheels. The workpieces are held captive in the spaces by pivotally mounted slide bars which engage peripherally located skids submerged in a cooling tank. Counter-balanced support dogs restrain and stabilize the workpieces against one side of the spokes.

BACKGROUND OF THE INVENTION

Figure 1:
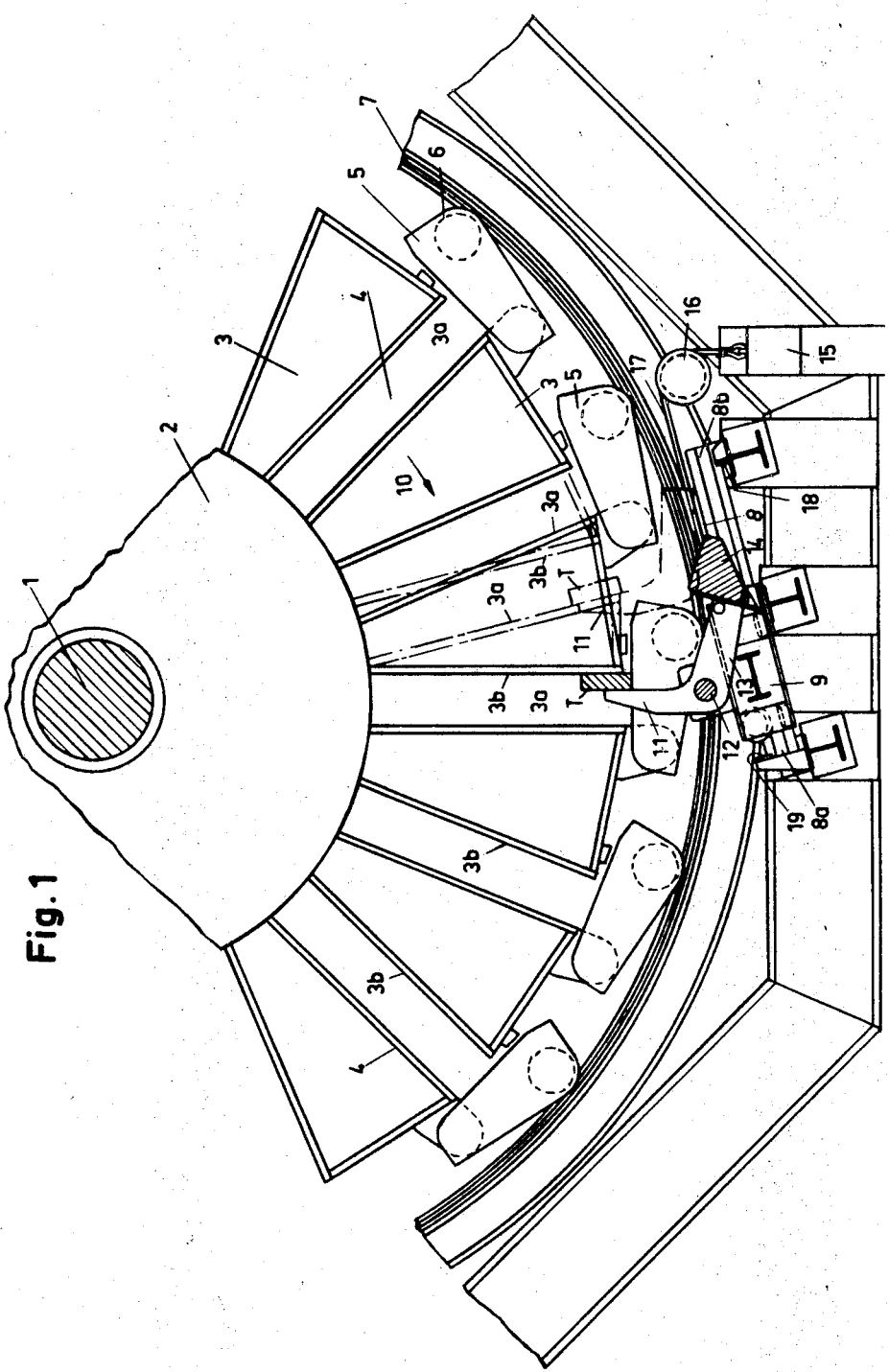

This invention relates to the class of apparatus for transversely conveying products delivered from a rolling mill. The apparatus generally includes a plurality of spaced-apart spoke wheels mounted on a horizontal drive shaft. The products are received in the spaces between the spokes and gripped in the lower peripheral half of the wheels which is located in a cooling tank.

As a rule the products that are received by this general type of apparatus have been previously reduced in a rolling mill to cross-sectional dimensions within predetermined limits. The spaces between the spokes, in which the round or rectangular products, such as slabs, are received are dimensioned to accommodate the cross-sectional size of the product. The product can therefore only tilt slightly, if at all, within the spaces after the wheel has rotated the product beyond the lowest point in the path of travel. This prevents the product from jamming in the spoke gaps and obviates operational difficulties with the apparatus.

However, it occasionally occurs that the products to be transported by the apparatus may vary considerably in diameter, width or thickness. This applies in particular should one and the same apparatus be required to handle products from a plurality of rolling mills, each of which is equipped to roll products of entirely different dimensions. Operating difficulties might then be experienced since the spaces between the spokes of the apparatus would, in this case, have to be dimensioned to suit the largest section to be transported and when smaller pieces are handled they will fall over after passing through the lowest point of the path of movement and jam in the spoke gaps.

One way to prevent the smaller sections falling over and getting stuck in the spaces between the spokes would be to insert liners to correspondingly reduce the space dimensions: but different liners would have to be fitted in each spoke gap for every different size of product handled. This would not only require a comparatively long time for dismantling one set, but also it requires a number of such liners to be kept in stock. This would considerably increase the capital outlay for such an apparatus as well as the operating costs, so that the apparatus would not be an economic proposition.

The object of the invention is to provide an apparatus of the afore-described type, with a minimum of technical resources to permit sections of widely varying dimensions to be transported without the smaller pieces becoming jammed in the spaces between the spokes.

The problem presented is the prevention of the small products from falling over and jamming in the spoke gaps when passing through the lowest point of the path of traverse. A basic solution to this problem is, according to the invention, substantially the provision of support dogs installed in relation to the spoke wheels in the vicinity of the skids. The support dogs are movable about a horizontal axis by a force acting in the turning circle of the products to be transported. The dogs are movably guided over a limited length of a downwardly inclined track in the rotational direction of the spoke wheels as well as subject to a restoring force toward the upper end and by the transported products are movable counter to the restoring force toward the lower end of the track and at the bottom thereof can be displaced out of the turning circle of the transported sections in opposition to the restoring force.

The advantage deriving is that before the transported sections have reached the lowest point of their path of travel, they make contact with the support dogs which stand erect at the upper end of their guideway. The products are retained by the support dogs until the rear wall of the spoke gap in the direction of rotation makes contact with a product during the subsequent travel. Then, the support dogs are entrained in the direction of travel by the transported sections until they approach the lower end of their guideway and the transported sections have reached the bottom point of their path of travel. After the support dogs have attained this bottom position, they are swung down counter to their righting force and remain in position during the upward movement from the lower point of the path of travel. As soon as a transported section has slid over the support dogs, the latter return to their upright position under the effect of the righting force and through their restoring force are moved to the upper end of their guideway, so as to be ready to receive the next rolled piece.

A preferred embodiment of the invention, applicable in particular to appaartus for moving sections through a tank of liquid, such as cooling or pickling installations, for example, employs balance weights for generating the righting and the restoring forces for the support dogs.

A further feature of the invention is the mounting of the support dogs outside the turning circle on a traveling carriage, which is traversible on fixed guide cheeks along a path limited by stops.

The most effective arrangement of the support dogs is, if according to the invention, the maximum length of the carriage travel is equal to or, preferably, less than the pitch distance of the spokes.

Another feature of the invention is that the lower end of the inclined track is at a greater radial distance from the turning circle of the transported products than the upper end of the track and in the direction of transportation extends beyond the lowest point of the path of travel.

In another embodiment of the invention the afore-described problem is solved by installing, instead of one support dog mounted on a spindle in the direction of the spoke wheel rotation and traversible along a downwardly inclined path, a plurality of support dogs are mounted in the direction of spoke wheel rotation on spindles in a fixed, staggered relation. The dogs can be individually and sequentially pressed out of the turning circle of the transported sections counter to the righting force generated by said sections in traverse. Such an arrangement lends itself, in particular, to apparatus used for conveying slabs through a tank of water for the purpose of accelerating the cooling of said slabs.

When the slabs are cooled, scale formed on their surfaces breaks off and settles on the bottom of the cooling tank. In the case of the first-described embodiment of the present invention, the scale can accumulate on the inclined guideway of the displaceable and swivable support dogs. This will eventually impede the movement of the support dogs on said guideway; and, even if balance weights are used, their action will not suffice to return the support dogs to their initial position at the desired speed. It is then by no means certain that the support dogs will grip the stock before it is able to cant in the gaps of the spoke wheels. An apparatus constructed according to the second embodiment of the invention avoids these drawbacks by simple means, namely, by employing exclusively support dogs swivel mounted on fixed spindles.

In a further practical development of the invention an apparatus, according to the second embodiment of the design principles, provides for the swivel ranges of the staggered support dogs to overlap in the rotational direction of the spoke wheels. The apparatus, according to the second embodiment, can also be equipped with balance weights to generate the righting forces for the support dogs; the balance weights are mounted on lever arms attached to the support dogs. It is particularly advantageous if the lever arms of the staggered support dogs are of different lengths. The arms on the front support dogs should be the longest and those on the rear support dogs the shortest. By this arrangement the greatest retaining force is exerted by the support dogs at the front in the rotational direction of the spoke wheels, and is diminished in increments at the other support dogs further along the path of rotation. Whereas it is for the front support dogs to retain the slabs within their effective range until the slabs have changed their contact position within the receiving gaps, the subsequent support dogs in the path of spoke wheel rotation have merely to retain the slabs after they have changed position.

To prevent the fairly closely spaced support dogs from hindering each other in operation, a further feature of the invention is the staggered lateral arrangement of the middle support dogs in relation to those at the front and back.

Figure 2:
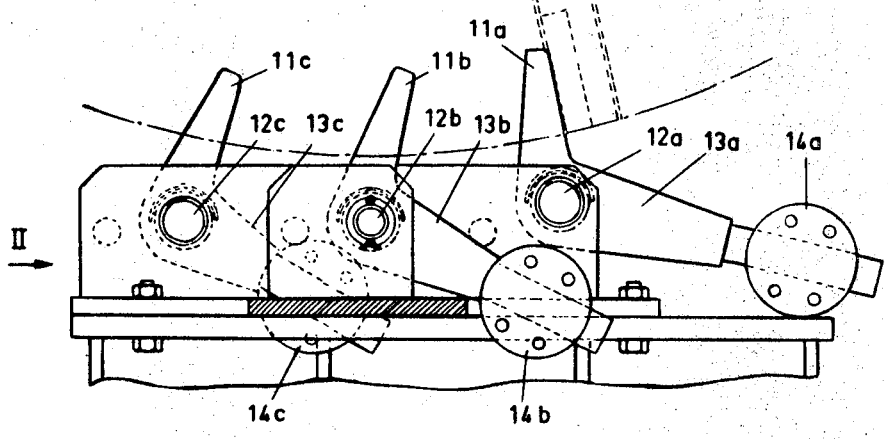
Figure 3:
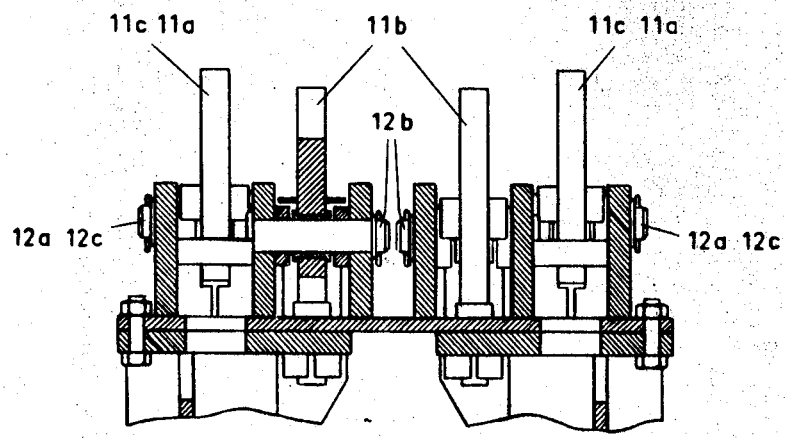

Two embodiments of the present invention are illustrated in the accompanying drawings of which:

FIG. 1 is a cross-sectional view of part of a rotary conveyor apparatus according to the first embodiment of the present invention showing the principal features of the invention, FIG. 2 is a cross-sectional view of part of a rotary conveyor apparatus showing the principal features of the second embodiment of the invention, and FIG. 3 shows the arrangement according to FIG. 2 viewed in the direction of arrow II.

The first embodiment of the present invention, as shown in FIG. 1, provides an arrangement whereby a plurality of spaced-apart spoke wheels 2 are keyed in a manner known in the art per se on a horizontal driving shaft 1. About the entire periphery of the wheels 2 are uniformly disposed segmental radiating members, herein referred to as spokes 3. The space between each two adjacent radiating members is referred to as a spoke gap 4. All the spoke gaps 4 are of uniform width over their full length.

At the extremity of each of the spokes 3 is attached a side bar 5, which is so mounted that it can swing over to close the end of the gap 4 between adjacent spokes 3 after a section T to be transported has taken up position in the gap 4. For this purpose a roller 6 is attached to the free end of each side bar 5 and arranged to run in contact with an arcuate rail 7 which extends almost over the entire lower half of the periphery of the spoke wheels 2.

As will be seen in FIG. 1, when a section T is traversed, it is supported on the side bars 5 and is thus prevented from skidding along the arcuate rail 7.

At a radial distance beyond the turning circle of the section T there is located guide cheeks 8 for a carriage 9. The guide cheeks are downwardly inclined in the rotational direction 10 of the spoke wheels. The forward ends 8a of the guide cheeks in the rotational direction 10 of the spoke wheels 2 extend beyond the lowest point of the path of travel and are at a greater radial distance from the path of travel than their rear ends 8b. A support dog 11 is mounted to swivel about a horizontal axis 12 on the carriage 9. This support dog 11 in conjunction with an arm 13 takes the form of an angle member. A righting force 14 which may be generated by a balance weight acts on arm 13 to induce the support dog 11 to take up an upright position, in which it projects into the turning circle of the section T. A restoring force is generated by a balance weight 15 and acts on the carriage 9. A rope running on a pulley 16 connects the balance weight 15 to the carriage 9 and thereby exerts a restoring force to induce the latter to travel from the upper end of guideways 8 up to stop 18. When the carriage is in the uper end position determined by the stop 18, support dog 11 will be located as shown in dashed outline in FIG. 1. During each incremental advance of the spoke wheels 2 in the direction of arrow 10, every individual section T in traverse located against face 3a of the respective spoke 3, makes contact with the support dog 11 in the position shown in dashed outline.

During the further movement of the spoke wheels 2 the section T is in contact with the support dog 11 and as a result is lifted from its location against face 3a of spoke 3. It is thus retained in position solely by support dog 11 until the opposite face of the section makes contact with surface 3b on the other side of the gap. Section T in traverse is then supported against surface 3b of spoke 3 for the onward movement in direction of rotation 10. The movement of the section T is transmitted to the support dog 11 and as a result thereof, the carriage on which said support dog is mounted moves downward on the guide cheeks 8 in the face of the restoring force exerted by means 15.

After the section T retained by the support dog 11 has reached the bottom point of its path of travel, the carriage 9 mounting the support dog runs up against the lower stop 19 on the guideways 8. As, however, the section T in traverse continues to be carried along in contact with surface 3b of spoke 3, the support dog 11 can no longer be maintained erect through the action of the righting force weight 14 and is forced downwards, thereby swivelling on axis 12 and clears the section T as it moves in the direction of rotaion 10 from the lowest point of its path of travel to proceed upwards. Through the righting force exerted by balance weight 14, the support dog 11 is returned to its erect position and at the same time through the restoring force of balance weight 15, the carriage 9 is traversed to the upper end stop 18 of the guide cheeks 8. In this position the support dog 11 is ready to receive the next section T to be conveyed. To prevent the support dog 11 from striking against a subsequent section T during the return travel of the carriage 9, the stops 18 and 19 fix the traverse of the carriage 9 on the guide cheeks 8. The carriage travel distance should not exceed, and should preferably be less than, the pitch of the spoke gaps 4. This insures that the support dog 11 will be in its initial position when contacted by the oncoming section T to be transported. Because the lower end of the guide cheeks is at a greater radial distance from the turning circle of section T than the upper end, the dog 11 provides maximum support when it contacts the section T in traverse. It also insures that the support dog 11 fairly quickly clears the section T after the lowest point of the path of travel has been passed.

The second embodiment of a rotary conveying apparatus shown in FIGS. 2 and 3 is distinguishable from the first embodiment by the fact that beyond the radius of the turning circle near the bottom point of the path of travel are arranged a plurality of support dogs. Three dogs 11a, 11b and 11c are shown, each swivably mounted on a horizontal axis 12, 12b and 12c. As will be seen in FIG. 2, axes 12a, 12b and 12c are spaced one behind the other in the rotational direction of the spoke wheels so that the swivel ranges of the individual support dogs 11a, 11b and 11c link up or, preferably, overlap. But to prevent any one dog from hindering the movement of the others, the middle support dogs 11b are laterally displaced in relation to the front support dogs 11a and the rear support dogs 11c. An angle member is formed by each of the support dogs 11a, 11b and 11c and an arm 13a, 13b and 13c, to which a righting force is applied by a balance weight 14a, 14b and 14c, for example. These balance weights keep the support dogs 11a, 11b and 11c in an upright position in which they project into the turning circle of the section in traverse.

At every increment of the spoke wheel rotation each section in its respective spoke gap duly makes contact with the front support dogs 11a. Through the action of the balance weight 14a on arm 13a, the section is retained by support dogs 11a during the subsequent rotation of the spoke wheels. As a result, the section contacted by support dogs 11a is lifted from the spoke face on which it is resting and is held in position only by the support dogs 11a, until the spoke face on the opposite side of the gap makes contact with the section. Through this contact the section is carried forward by the rotating spoke wheels. The movement of the stock causes the support dogs 11a on which the balance weight is acting to swivel downwards on fixed axis 12a to clear completely the turning circle of the section in traverse. Shortly before support dogs 11a are displaced beyond the turning circle of the stock, the respective section runs up against the next support stops 11b, which retain it against canting in the spoke gap during the subsequent rotation of the rotary conveyor apparatus.

Shortly before each of the support dogs 11b is displaced beyond the turning circle of the section, the section comes up against a third support dog 11c. As the conveyor continues to rotate, this support dog 11c is also displaced beyond the turning circle of the section in traverse. By this time the angular position of the section contained within the spoke gap will have been changed to an extent that the section can no longer tilt in its wheel compartment. An advantage of the support dogs 11a, 11b and 11c resides in their staggered arrangement and, thereby, make contact with and clear the individual sections in sequence and in that the front support dog 11a is able to engage a subsequent section when the rear support dog 11c is still in engagement with the previous one.

To insure that the requisite force is exerted on the individual sections by the staggered support dogs 11a, 11b and 11c, the arms 13a, 13b and 13c are varied in length. The longest arm is 13a which with the front support dog 11a constitutes an angle member. It is the front support dog that has to exert the biggest force because it has to retain in a given upright position the approaching section, and support it during the transfer from one side of the wheel gap to the other. Only after the piece rests against the opposite side of the wheel compartment may the support dog 11a, subjected to the load of the balance weight attached to arm 13a, move out of the turning circle of the section. By contrast, the purpose of support dogs 11b and 11c is to retain the section during its movement through the lowest point of the path of travel so that it cannot cant in the wheel compartment. For this reason, arms 13b and 13c are shorter than arm 13a. The shortest of the arms is 13c.

It will be evident that a rotary conveyor equipped with support dogs according to the invention provides a simple means for the prevention of tilting over and jamming of sections in the compartments of spoke wheels when passing through the lowest point of their path of travel. This means that stock of smaller cross-section can also be handled without risk of operational difficulties.

The conveying apparatus with a support dog arrangement, according to FIGS. 2 and 3, has an advantage over an apparatus with a support dog arrangement according to FIG. 1 in that its performance will not be impaired should a large amount of loose scale break off the sections handled during the rotary movements. A rotary conveying apparatus equipped with such a support dog arrangement will, therefore, operate dependably irrespective of the nature and condition of the oxidized surface of the stock.

The invention is not confined to the aforesaid and illustrated embodiments. There are various modified forms the rotary conveying apparatus can take according to the invention. For instance, instead of counterweights to generate the adjusting forces, hydraulic, pneumatic or mechanical spring counterbalances can be employed.

In accordance with the provisions of the patent statutes, we have explained the principle and operation of our invention and have illustrated and described what we consider to represent the best embodiment thereof. However, we desire to have it understood that within the scope of the appended claims, the invention may be practiced otherwise than as specifically illustrated and described.

We claim:
1. An apparatus for conveying round or flat products, such as delivered from a rolling mill, comprising:
 a plurality of wheels each including a plurality of radially extending spokes defining gaps therebetween for receiving products to be conveyed by the lower peripheral part of said wheels;
 a horizontal driven shaft rigidly mounting said wheels in a spaced relation;
 said spokes defining by their radially extended ends a turning circle within which products are transferred;
 skid means arranged a predetermined distance beyond said turning circle;
 a support dog pivotally mounted about a horizontal axis for restraining movement of a product within said gap;
 first force generating means acting on said dog for pivotally urging it into a position intersecting said turning circle;
 a track slidably supporting said dog and downwardly inclined with respect to rotation of said wheels; and
 a second force generating means connected to said dog for urging it in a direction opposite to the inclination of said track.

2. An apparatus according to claim 1 wherein said first force generating means and said second force generating means comprise:
 balance weights operatively connected to said support dog.

3. An apparatus according to claim 1 further comprising:
 a carriage pivotally mounting said support dog and for slidably supporting said dog on said track; and
 stop means for limiting sliding movement of said dog.

4. An apparatus according to claim 3 wherein said stops are spaced at a distance not greater than the distance between two adjacent spokes.

5. An apparatus according to claim 1 wherein the lower end of said track is constructed and arranged at a greater radial distance from said turning circle than the upper end of said track;
 said lower track projecting below the lowest elevation of said turning circle.

6. An apparatus for conveying round or flat products, such as delivered from a rolling mill, comprising:
 a plurality of wheels each having a plurality of radially extending spokes defining gaps therebetween for receiving products to be conveyed by the lower peripheral part of said wheels;

a horizontal driven shaft rigidly mounting said wheels in a spaced relation along said shaft;

said spokes defining by their radially extending ends a turning circle in which products are transferred by said gaps;

a plurality of dogs mounted on fixed stationary axes for restraining movement of a product within said gap;

said dogs being mounted with their axes in staggered relationship with respect to rotation of said wheels; and force generating means acting on each of said dogs for independently urging them into a position intersecting said turning circle and projecting partially into said gaps.

7. An apparatus according to claim 6 wherein said dogs are mounted for overlapping pivotal movement in the rotational direction of said wheels.

8. An apparatus according to claim 6 wherein said force generating means comprises:

balance weights;

an arm connected to each dog and mounting one of said balance weights.

9. An apparatus according to claim 8 wherein said arm for each of said dogs is constructed with a different length, the first dog in the direction of rotation having the longest arm and the last dog in the direction of rotation having the shortest arm.

10. An apparatus according to claim 9 wherein a dog intermediate said front and back dogs is laterally displaced in relation thereto.

References Cited

UNITED STATES PATENTS

| 1,525,192 | 2/1925 | McFarland. |
| 2,166,381 | 7/1939 | Taylor et al. 198—210 |
| 2,762,274 | 9/1956 | Kerr 198—210 X |

HARVEY C. HORNSBY, Primary Examiner

D. D. WATTS, Assistant Examiner

U.S. Cl. X.R.

221—217